July 19, 1949.　　　　A. H. HAWES　　　　2,476,863
SCAFFOLDING CLAMP
Filed Aug. 21, 1946
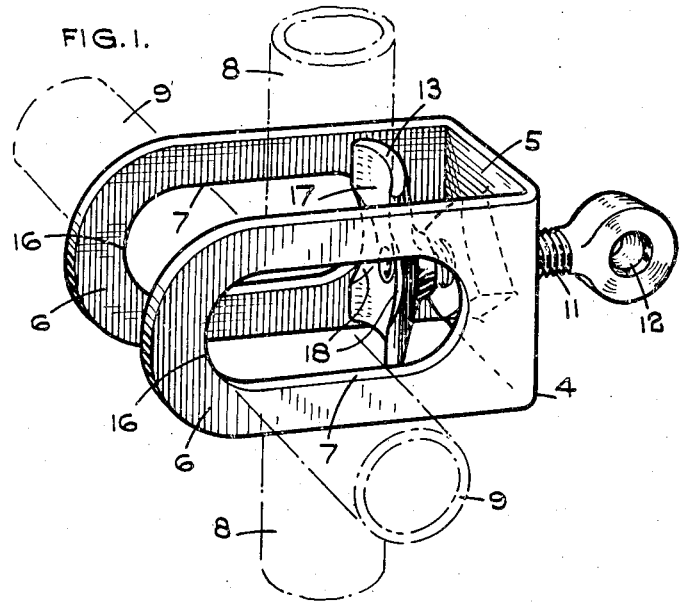
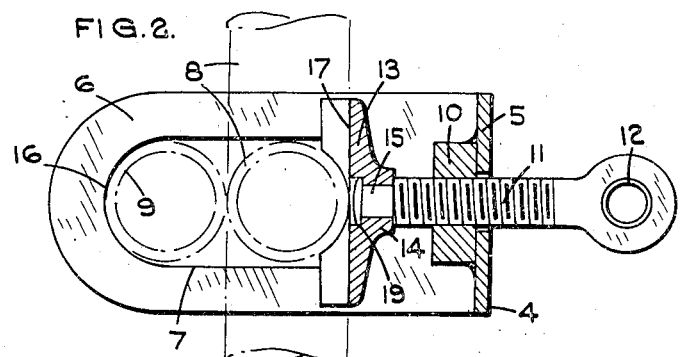
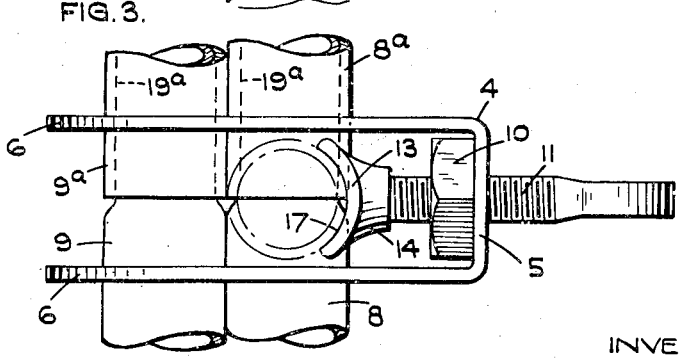
INVENTOR
Albert Henry Hawes
BY Henry J. Ruecke
ATTORNEY.

Patented July 19, 1949

2,476,863

UNITED STATES PATENT OFFICE 2,476,863

SCAFFOLDING CLAMP

Albert Henry Hawes, Erdington, Birmingham, England, assignor, by mesne assignments, to Kwikform Limited, Small Heath, Birmingham, England, a British company Application August 21, 1946, Serial No. 691,932
In Great Britain May 13, 1944

Section 1, Public Law 690, August 8, 1946
Patent expires May 13, 1964

8 Claims. (Cl. 287—54)

This invention relates to scaffolding clamps for connecting together a pair of elongated scaffolding members such as poles or tubes, and is concerned with such scaffolding clamps of the type comprising a body of substantially U shape, the body including a pair of limbs joined by a connecting part and carrying means for applying clamping pressure to one member so as to clamp it in relation to the other and secure the latter in clamping engagement with a part of the body so that the two members are secured together in a desired relationship.

The primary object of this invention is to provide an improved and simple construction of clamp which can be employed at will for securing together the two members in either parallel or transverse relationship as desired.

Other objects of the invention will become apparent from the following description and the drawings accompanying same in which:

Figure 1 is a perspective view of one form of scaffolding clamp in accordance with this invention, the clamp being illustrated with the two members secured together at right angles to one another.

Figures 2 and 3 are a sectional side elevation and a plan view, respectively, showing the manner of using the clamp for securing together two scaffold members placed either at right angles or mutually parallel. Figure 3 shows also how the clamp can be used for securing two sets of scaffold members in both parallel and end to end relationship.

In the construction illustrated the body 4 of the clamp is formed by bending a single blank of sheet metal into substantially U shape so as to form a flat connecting part 5 which joins together the two limbs 6 of the body, which limbs are also flat and are parallel to one another.

Each limb 6 is formed with a hole 7 which is of an elongated form, the elongation being along the length of the limb as will be apparent from the drawing, and the length of each of the elongated holes is such as to permit of them receiving the two scaffolding members (indicated at 8, 9) in abutting parallel relationship as will be apparent from Figures 2 and 3 of the drawings, while the two limbs are spaced apart from one another to an extent sufficient to permit of one of the members, namely the member 8 which is nearest to the connecting part 5, being disposed also between the limbs in the manner shown in Figure 1, which spacing will be apparent from Figure 3.

The central part 5 of the body 4 is provided with a tapped hollow boss which is formed by welding a nut 10 to the inner surface of the connecting part, and engaged in this hollow boss is a clamping screw 11 whose outer end is conveniently flattened and provided with a tommy-bar hole 12, or the screw may have any other means for enabling it to be rotated.

The inner end of the screw 11 has rotatably mounted thereon a pressure plate 13, which may be made from a stamping, the face of this pressure plate adjacent the screw 11 being provided with a hollow boss 14. The screw end is reduced in diameter, as at 15, passed through this boss 14 and riveted over at the opposite side of the pressure plate 13, while the width of the pressure plate is only slightly less than the distance between the two limbs 6 of the body as will be apparent from Figure 3 so that when the screw 11 is turned, rotation of the plate is prevented, the turning movement of the screw necessarily advancing or retracting the plate.

When it is desired to secure together the two scaffold members in mutually perpendicular relationship, the U-shaped body 4 is placed astride the member 8, whilst the other member 9 is slipped through the holes 7 in the body limbs at a position remote from the connecting part 5, as shown in Figure 1, the pressure plate 13 is now advanced into engagement with the adjacent member 8, thus pressing it against the transverse member 9, and the latter against the adjacent edges 16 of the elongated holes 7 in the clamp limbs, until the two scaffold members are firmly locked together at their intersection.

When it is desired to secure together the two scaffold members in mutual parallel relationship, the member 9 is again slipped through the holes 7 in the body limbs at a position remote from the connecting part 5 and the other member 8 is passed through the holes 7 at a position near to the connecting part 5, whereupon the clamping screw 11 is tightened to secure the two members together in the manner indicated in Figures 2 and 3 of the drawings.

The pressure plate 13 is shaped to conform with the configuration of the scaffold member 8 which is near to the connecting part 5 so as to be in clamping engagement therewith when this is disposed either parallel or perpendicular to the member 9. In the arrangement actually illustrated, both of the members comprise hollow tubes of cylindrical form and the pressure plate 13 is formed on its face remote from the clamping screw with two sets of part circular recesses 17, 18 extending at right angles to one another which are curved to conform to the cylindrical shape of the scaffold members, while to prevent the inner end of the clamping screw from engaging with the adjacent scaffold member, the said end including the riveted-over part thereof is contained within a cylindrical recess 19 formed centrally in the inner face of the pressure plate.

Furthermore to ensure adequate clamping engagement between the edges 16 of the elongated hole which are remote from the connecting part 5 and which engage the scaffold member 9, these edges are of part circular configuration as well be apparent from Figure 2.

Instead of providing the pressure plate 13 with the two sets of recesses 17 and 18, it may be recessed in one direction only and may be made of such dimensions that it can be adjusted angularly between the clamp limbs to suit the position of the adjacent scaffold member 8.

This scaffolding clamp is of an extremely simple and cheap construction and easy to fit and operate and can be used with scaffold members of different diameters within the limits imposed by the dimensions of the holes 7.

In Figure 3 there is shown also how the clamp may be used for securing together two sets of scaffolding tubes in both end to end and parallel relationship and to permit of this the tubes 8, 9 are provided at the ends with spigots 19a of reduced section which fit into the ends of similar tubes 8a, 9a respectively so that the tubes 8, 8a and the tubes 9, 9a are in end to end relationship respectively being held in this position by the engagement of the pressure plate 13 with the adjacent ends of the tubes 8, 8a and by the engagement of the tubes 9, 9a with the edges 16 of the holes 7 in the two limbs 6 of the clamp.

What I claim then is:

1. A scaffolding clamp for connecting together two elongated scaffolding members comprising a substantially U-shaped body, said body including a pair of limbs having each a hole elongated along the length of the limb, said holes being adapted to receive the two scaffolding members in mutual parallel relationship, the limbs being spaced apart to an extent sufficient to receive therebetween one of the scaffolding members in transverse relationship to the other member, a clamping screw mounted on the part of the body connecting said limbs, said clamping screw being adapted to apply pressure to one of said members in positions in which it is disposed between the limbs as well as extending through the said holes, and the edges of the holes remote from the clamping screw being adapted to engage with the member remote from the screw when the clamping pressure is applied.

2. A scaffolding clamp for connecting together two elongated scaffolding members comprising a substantially U-shaped one-piece sheet metal body, said body including a pair of limbs having each a hole elongated along the length of the limb, said holes being adapted to receive the two scaffolding members in mutual parallel relationship, the limbs being spaced apart to an extent sufficient to receive therebetween one of the scaffolding members in transverse relationship to the other member, a clamping screw mounted on the part of the body connecting said limbs, said clamping screw being adapted to apply pressure to one of said members in positions in which it is disposed between the limbs as well as extending through the said holes, and the edges of the holes remote from the clamping screw being adapted to engage with the member remote from the screw when the clamping pressure is applied.

3. A scaffolding clamp for connecting together two scaffolding tubes of circular form in cross section comprising a substantially U-shaped body, said body including a pair of limbs having each a hole elongated along the length of the limb, each hole having a pair of straight parallel edges extending along the length of the limb and terminating in semicircular edges of configuration corresponding to the external configuration of the tubes to be connected, a clamping screw mounted on the part of the body connecting said limbs, said holes being adapted to receive said two tubes in mutual parallel abutting relationship with one another and the limbs being spaced apart to an extent sufficient to permit of one tube being disposed therebetween and between the clamping screw and the other tube extending at right angles thereto in abutment therewith, and said clamping screw being adapted to apply pressure to the adjacent tube in either of its two positions and force it into clamping engagement with the other tube.

4. A scaffolding clamp for connecting together two scaffolding tubes of circular form in cross section comprising a substantially U-shaped one-piece sheet metal body, said body including a pair of limbs having each a hole elongated along the length of the limb, each hole having a pair of straight parallel edges extending along the length of the limb and terminating in semi-circular edges of configuration corresponding to the external configuration of the tubes to be connected, a clamping screw mounted on the part of the body connecting said limbs, said holes being adapted to receive said two tubes in mutual parallel abutting relationship with one another and the limbs being spaced apart to an extent sufficient to permit of one tube being disposed therebetween and between the clamping screw and the other tube extending at right angles thereto in abutment therewith, and said clamping screw being adapted to apply pressure to the adjacent tube in either of its two positions and force it into clamping engagement with the other tube.

5. A scaffolding clamp for connecting together two scaffolding tubes of circular form in cross section comprising a substantially U-shaped body, said body including a pair of limbs having each a hole elongated along the length of the limb, said holes being adapted to receive the two scaffolding tubes in mutual parallel relationship, the limbs being spaced apart to an extent sufficient to receive therebetween one of the scaffolding tubes in perpendicular relationship to the other tube, a clamping screw mounted on the part of the body connecting said limbs, a pressure plate rotatable on the inner end of said clamping screw, the inner face of said plate having a pair of recesses of part circular configuration disposed at right angles to one another adapted to engage with one of the tubes in either of its two positions to apply clamping pressure thereto, and the edges of the holes remote from the clamping screw being adapted to engage with the tube remote from the screw when the clamping pressure is applied.

6. A scaffolding clamp for connecting together two scaffolding tubes of circular form in cross section comprising a substantially U-shaped one-piece sheet metal body, said body including a pair of limbs having each a hole elongated along the length of the limb, each hole having a pair of straight parallel edges extending along the length of the limb and terminating in semi-circular edges of configuration corresponding to the external configuration of the tubes to be connected, a clamping screw mounted on the part of the body connecting said limbs, said holes being adapted to receive said two tubes in mutual parallel abutting relationship with one another and the limbs being spaced apart to an extent sufficient to permit of one tube being disposed therebetween and between the clamping screw and the other tube extending at right angles thereto in abutment therewith, a pressure plate rotatable on the inner end of said clamping screw, the inner face of said plate having a pair of recesses of configuration corresponding to the external configuration of the tubes to be connected and disposed at right angles to one another, said recesses being adapted to engage with one of the tubes in either of its two positions to apply clamping pressure thereto when the clamping screw is tightened.

7. In a scaffolding structure the combination of two parallel pairs af aligned scaffolding tubes, one tube of each pair having a spigot extending into the end of the other tube, with a scaffolding clamp connecting said tubes together, said clamp comprising a substantially U-shaped body, said body including a pair of limbs having each a hole elongated along the length of the limb, said elongated holes receiving said two parallel pairs of tubes in aligned abutting relationship with each hole engaging one tube of each pair, a clamping screw mounted on the part of the body connecting said limbs, a pressure plate rotatable on the inner end of said clamping screw and having a pair of aligned spaced recesses of configuration corresponding to the external configuration of the adjacent pair of aligned tubes and secured in engagement one with each tube of the adjacent pair by pressure exerted by the clamping screw.

8. In a scaffolding structure the combination of two parallel pairs of aligned scaffolding tubes, one tube of each pair having a spigot extending into the end of the other tube, with a scaffolding clamp connecting said tubes together, said clamp comprising a substantially U-shaped one-piece sheet metal body, said body including a pair of limbs having each a hole elongated along the length of the limb, each hole having a pair of straight parallel edges extending along the length of the limb and terminating in semi-circular edges of configuration corresponding to the external configuration of the connected tubes, said elongated holes receiving said two parallel pairs of tubes in aligned abutting relationship with each hole engaging one tube of each pair, a clamping screw mounted on the part of the body connecting said limbs, a pressure plate rotatable on the inner end of said clamping screw and having a pair of aligned spaced recesses of configuration corresponding to the external configuration of the adjacent pair of aligned tubes and secured in engagement one with each tube of the adjacent pair by pressure exerted by the clamping screw.

ALBERT HENRY HAWES.

REFERENCES CITED

The following references are of record in the file of this patent:

UNITED STATES PATENTS

| Number | Name | Date |
| --- | --- | --- |
| 655,951 | Bates | Aug. 14, 1900 |
| 1,345,012 | Jones | June 29, 1920 |

FOREIGN PATENTS

| Number | Country | Date |
| --- | --- | --- |
| 322,560 | Great Britain | Dec. 12, 1929 |
| 400,866 | Great Britain | Nov. 2, 1933 |